United States Patent
Robinson

(10) Patent No.: US 10,096,264 B2
(45) Date of Patent: Oct. 9, 2018

(54) TACTILE INTERFACE FOR VISUALLY IMPAIRED

(71) Applicant: Lenovo (Singapore) Pte. Ltd., Singapore (SG)

(72) Inventor: Douglas Warren Robinson, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 244 days.

(21) Appl. No.: 14/276,020

(22) Filed: May 13, 2014

(65) Prior Publication Data
US 2015/0331528 A1    Nov. 19, 2015

(51) Int. Cl.
G09B 21/00       (2006.01)
G06F 3/01        (2006.01)
G06F 3/0482      (2013.01)

(52) U.S. Cl.
CPC .......... G09B 21/004 (2013.01); G06F 3/013 (2013.01); G06F 3/016 (2013.01); G06F 3/0482 (2013.01); *G06F 2203/04809* (2013.01)

(58) Field of Classification Search
CPC combination set(s) only.
See application file for complete search history.

(56) References Cited

U.S. PATENT DOCUMENTS

| | | | |
|---|---|---|---|
| 2006/0009243 A1* | 1/2006 | Dahan et al. | 455/466 |
| 2008/0150911 A1* | 6/2008 | Harrison | 345/173 |
| 2009/0259688 A1* | 10/2009 | Do | G09B 21/00 |
| 2011/0077548 A1* | 3/2011 | Torch | A61B 3/112 600/558 |
| 2012/0299853 A1* | 11/2012 | Dagar | 345/173 |
| 2014/0085221 A1* | 3/2014 | Kim | 345/173 |
| 2014/0281950 A1* | 9/2014 | White | G06F 3/0488 715/269 |
| 2015/0314681 A1* | 11/2015 | Riley, Sr. | B60K 28/066 340/576 |

OTHER PUBLICATIONS

Tactus Technology, "Taking Touch Screen Interfaces Into A New Dimension", 2012 (13 pages).
Schneider et al., "Neurological Basis for Eye Movements of the Blind", PLoS ONE 8(2), Feb. 18, 2013 (10 pages).
Size and Spacing of Braille Characters, ca. 2008 (4 pages).
Leich and Zee, "Eye movements of the blind", Invest. Ophthalmol. Vis. Sci., Mar. 1980 (4 pages).

* cited by examiner

*Primary Examiner* — Robin Mishler
(74) *Attorney, Agent, or Firm* — Brian J. Pangrle

(57) ABSTRACT

An apparatus can include a processor; memory operatively coupled to the processor; a touch-sensitive display operatively coupled to the processor; and a tactile braille panel operatively coupled to the processor where the tactile braille panel overlays at least a portion of the touch-sensitive display.

14 Claims, 10 Drawing Sheets

Braille Mode 103

TACTILE INTERFACE FOR VISUALLY IMPAIRED

TECHNICAL FIELD

Subject matter disclosed herein generally relates to informational interfaces.

BACKGROUND

Various devices, systems, etc. include a display for rendering information (e.g., text, images, graphics, etc.). Various technologies and techniques described herein pertain to rendering of information.

SUMMARY

An apparatus can include a processor; memory operatively coupled to the processor; a touch-sensitive display operatively coupled to the processor; and a tactile braille panel operatively coupled to the processor where the tactile braille panel overlays at least a portion of the touch-sensitive display. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

Figure 1:
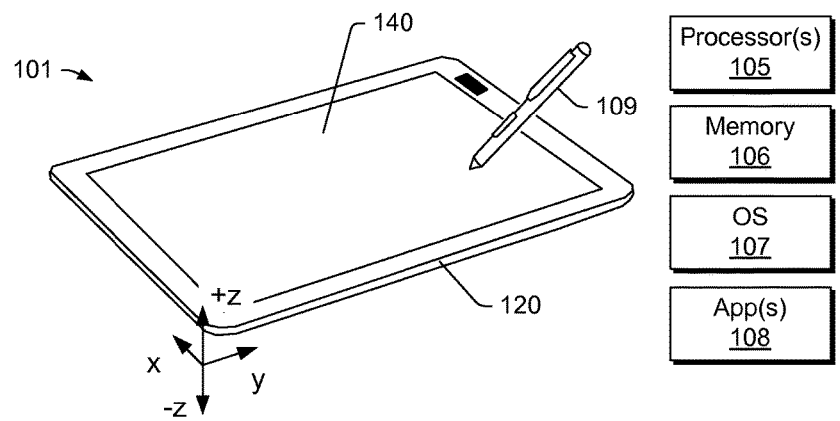
FIG. 1 is a diagram of an example of a device that includes a tactile panel where the device may operate in a braille mode.
Figure 1:
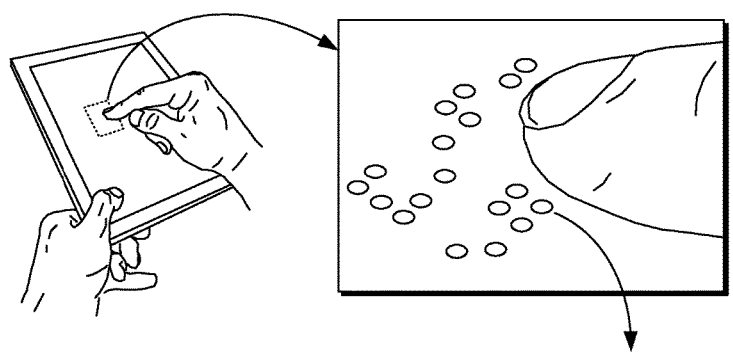
Figure 1:
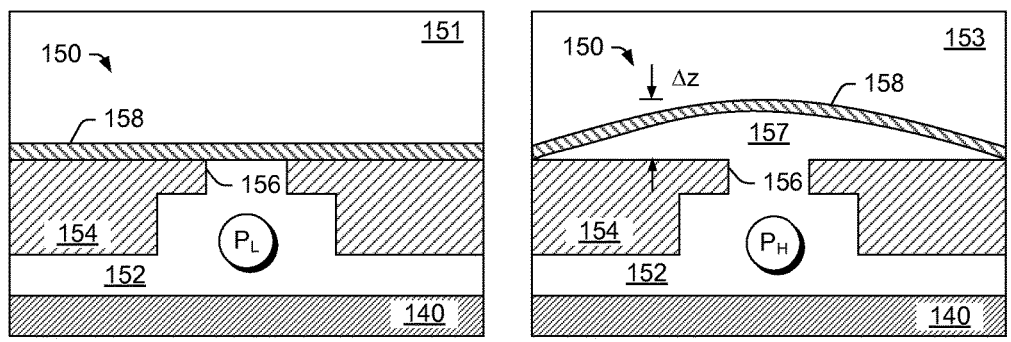

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a device can include a tactile interface that can render information tactilely, for example, for understanding by those that may be visually impaired. In such an example, the device may include a tactile layer (e.g., a tactile panel) that can include structural features that allow it to produce raised areas. As an example, the tactile layer and its raised areas may be transparent (e.g., clear). In such a manner, the transparency of the tactile layer may minimize interference with an underlying display. As an example, a display of a device may visually render representations of keys and a tactile layer may render tactile representations of the keys, for example, as tactile bumps. In such an example, the tactile representations of the keys may optionally overlay the visual representations of the keys.

As an example, a tactile panel may include structural features that allow for rendering of braille representations of letters, numbers, symbols, etc. As an example, consider a smartphone or a tablet where braille is rendered over a keyboard, a keypad, etc. so that a visually impaired person may interact with the smartphone or the tablet (e.g., via touch). As an example, a tactile panel may include one or more components (e.g., a membrane, etc.) that may be designed to correspond to a layout of a particular device (e.g., a smartphone, a tablet, etc.).

As an example, a tactile panel may be used to provide visually impaired individuals access to various applications executable, at least in part, via a device. For example, consider a tactile panel that allows for tactile input to access and interact with a music playing application. As an example, a device may tactilely render an application icon where a user may select the icon to launch (e.g., execute) the application. As an example, where the application is a media player, a device may tactilely render one or more controls such as, for example, a fast-forward control, a rewind control, a pause control and a stop control (e.g., also consider examples such as a sound control, a record control, a media selection control, etc.).

As an example, a device may include a processor; memory operatively coupled to the processor; a display operatively coupled to the processor; and a tactile panel operatively coupled to the processor where, for example, the tactile panel overlays at least a portion of the display. In such an example, the device may include touch-sensing circuitry, for example, to allow for input via touching of the display and/or the tactile panel. As an example, touch-sensing circuitry may be that of a touchscreen (e.g., a touch-sensitive display). In such an example, addition of a tactile panel may allow for rendering of information tactilely, rendering of information visually and receiving input via touch.

As an example, touch may be registered in one or more dimensions. With respect to a tactilely rendered control, as an example, consider touch being registered at least in part in a dimension that corresponds to elevation of the control, which may diminish in response to touch (e.g., pressure applied by a finger). In such an example, the tactilely rendered control may respond to a touch and then adjust a response based at least in part on pressure that may diminish elevation of the tactilely rendered control (e.g., based on a change in pressure, finger area interaction with a touch-sensitive display, etc.).

FIG. 1 shows an example of a device 101 that may operate in a braille mode 103. In FIG. 1, the device 101 is illustrated along with a Cartesian coordinate system that includes x, y and z axes. Various features of the device 101 may be described with respect to the Cartesian coordinate system. For example, length (e.g., along a y-axis), width (e.g., along an x-axis), elevation/depth (e.g., along a z-axis), aspect ratios, areas, relationships between features, etc. may be described with respect to the Cartesian coordinate system.

In FIG. 1, the device 101 includes one or more processors 105, memory 106, an operating system 107 (e.g., or operating systems) and one or more applications 108. The device 101 can include a housing 120 and a display 140. As an example, the display 140 may be a touch-sensitive display. Such a display may be configured with circuitry to sense touch via a finger, a stylus 109, etc., for example, to input information such as, for example, commands, selections, digital ink, etc. As an example, an operating system environment may be established by executing instructions of the operating system 107 stored in the memory 106 of the device 101 using at least one of the one or more processors 105. In such an example, the operating system environment may call for rendering information to a display, receiving and processing input from a surface using a stylus, a finger, etc. As an example, an application may be executable in an established operating system environment, for example, to provide for rendering information to the display 140.

In FIG. 1, the display 140 of the device 101 may include a LCD flat panel display with associated LCD driver circuitry. While LCD may be an acronym for "liquid crystal display", LCD finds uses as "LCD display", for example, as an adjective for "display" (e.g., a type of display). In FIG. 1, the display 140 may employ one or more other technologies, for example, consider technologies such as LED, plasma, etc.

As to a touch-sensitive display or touchscreen, the display 140 may include hardware for capacitive, resistive, acoustic, optical, embedded or one or more other "touch" technologies. As an example, a capacitive touchscreen may include circuitry for projected capacitance, surface capacitance, etc. Touch technology may include circuitry for sensing voltage, current, ultrasonic waves, capacitance change, light, images, force, etc. As an example, multi-touch may be defined as the ability for a touchscreen to recognize two or more simultaneous touch points.

As an example, a touch-sensitive display may include a drive electrode and a receive electrode. In such an example, charge may be provided to the drive electrode such that an electric field is formed with respect to the receive electrode. The electric field may be referred to as a "projected" electric field, for example, that corresponds to a technology known as "projected capacitance" (e.g., "p-cap"). A projected electric field may be available for "field coupling" by introduction of a conductive object (e.g., a finger of a hand, etc.) where a portion of the projected electric field couples with the conductive object, which leaves a remaining portion of the projected electric field coupling with the receive electrode. In such an example, the field coupling with the conductive object acts to reduce charge collected by the receive electrode. In turn, the collected charge may be used as an indicator of the conductive object being at or near a particular surface location on the display 140 (e.g., a particular x,y location in an x,y-plane). As an example, an area of "contact" may be determined.

In FIG. 1, the display 140 may optionally include an electromagnetic digitizer panel and electromagnetic digitizer circuitry. In such an example, energy may be induced in a resonant circuit of the stylus 109 by a field generated by the electromagnetic digitizer panel. The resonant circuit of the stylus 109 then makes use of this energy to return a signal to the electromagnetic digitizer panel where input signals may determine, for example, one or more of coordinate position, angle, speed, writing pressure, etc. As an example, an electromagnetic digitizer panel may include a sheet manufactured from glass epoxy resin or from a polyimide and PET formed film in which a large number of overlapping loop coils are arranged in a matrix in the x and y axis directions.

As illustrated in FIG. 1, the device 101 may operate in the braille mode 103. For example, the device 101 may render braille characters via a tactile panel 150 that may overlay at least a portion of the display 140. As an example, the device 101 may implement a method that includes rendering information to the display 140 (e.g., via an LED flat panel, an LCD flat panel, etc.); and rendering braille characters to the tactile panel 150, which may overlay at least a portion of the display 140. In such an example, the display 140 may be a touch-sensitive display (e.g., to a finger, a stylus, etc.).

As shown in the example of FIG. 1, the device 101 can include the processor 105, the memory 106 (e.g., operatively coupled to the processor 105), the display 140 (e.g., operatively coupled to the processor 105), and a tactile panel 150 (e.g., operatively coupled to the processor 105) where, for example, the tactile panel 150 overlays at least a portion of the display 140, which may be a touch-sensitive display.

FIG. 1 shows the tactile panel 150 in two states 151 and 153 with respect to a braille "dot" shape. As shown, a base layer may be the display 140. The display 140 may include a planar component that may define in part a chamber 152 with respect to a component 154 or, for example, the tactile panel 150 may include a base layer that defines in part the chamber 152. As shown, the tactile panel 150 includes an opening 156 that opens to a compartment 157 that may increase in volume due to an increase in fluid pressure for a fluid in the chamber 152. As shown, the compartment 157 is defined in part by a component 158, which may be flexible to respond to an increase in fluid pressure. As shown in the example of FIG. 1, the compartment 157 is adjustable to form a shape that may include one or more dimensions of a braille dot. In the example of FIG. 1, the state 151 may be referred to as a disengaged dot state, with respect to the tactile panel 150, and the state 153 may be referred to as an engaged dot state, with respect to the tactile panel 150.

As an example, a tactile panel may include circuitry that controls fluid in a fluidic network (e.g., fluidic circuitry). For example, microfluidic technology may be employed with fluid pathways (e.g., channels) that may be individually controlled via circuitry with respect to fluid pressure. Circuitry may be operatively coupled to one or more fluid pumps, one or more fluid valves, etc. A tactile panel may be at least in part transparent, for example, to an extent that information rendered to a display located below a transparent portion of the tactile panel may be visible (e.g., to a sighted individual).

Figure 2:
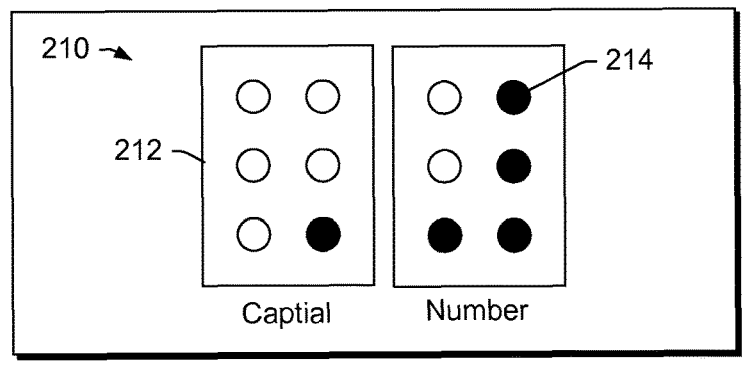
FIG. 2 is a diagram of an example of braille, an example of a device that includes a tactile panel and an example of a method.
Figure 2:
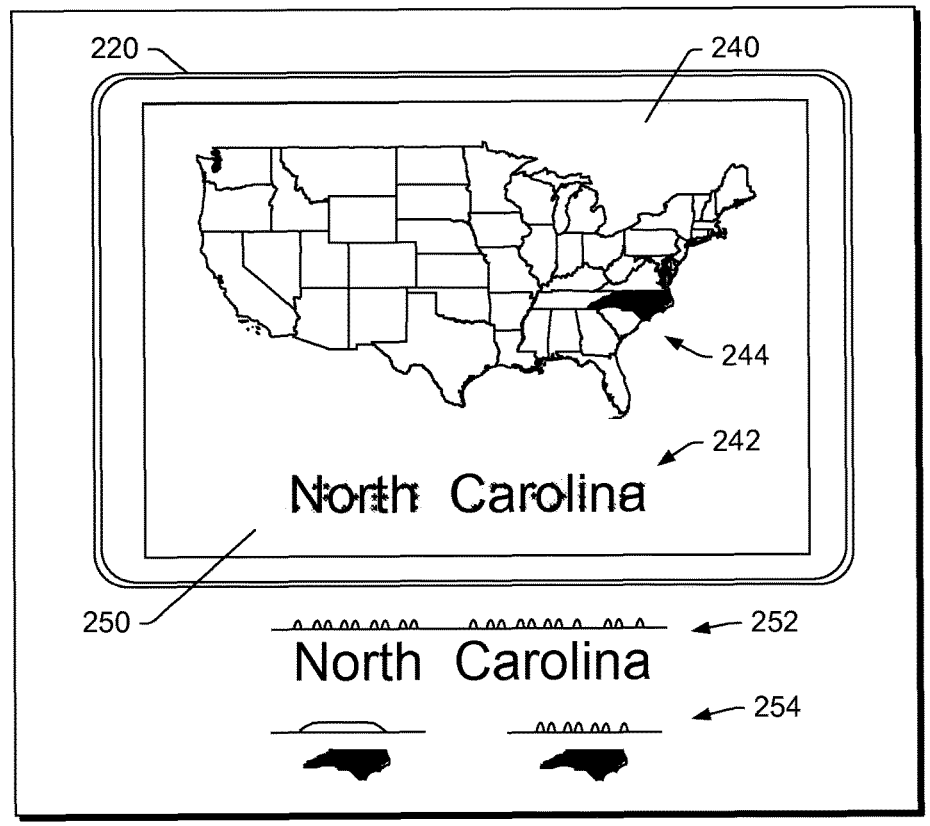
Figure 2:
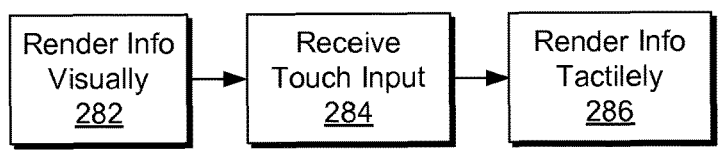

FIG. 2 shows an example of a braille standard 210 along with an example of a device 220 and an example of a method 280. Braille refers to various aspects of a tactile writing system used by the blind and the visually impaired. Braille characters are defined with respect to rectangular blocks called cells that include one or more dots. According to various standards, a full cell is three dots high and two dots wide where each cell may contain six dots such that 63 different characters may be formed; noting that some braille standards may implement more dots such as, for example, eight dots (e.g., four dots high and two dots wide). Braille may be defined according to a standard to have a fixed-width font meaning that individual characters occupy the same amount of space, regardless of how many dots are in the cell.

The number and arrangement of the one or more dots can distinguish one character from another. Mappings (e.g., sets of character designations) can vary from language to language. Further, in English braille there are three levels of encoding: Grade 1, a letter-by-letter transcription used for basic literacy; Grade 2, an addition of abbreviations and contractions; and Grade 3, various non-standardized personal shorthands. As an example, braille cells may be used to form embossed illustrations and graphs, for example, with lines either solid or made of series of dots, arrows, bullets, etc.

As shown in FIG. 2, the braille standard 210 may include a cell 212 that has a defined size and dots 214 that have a defined size. Braille may employ formatting, such as formatting marks that affect interpretation of a cell that follows. For example, in English braille, a single dot in the lower right indicates that a character of a cell that follows is capitalized and a right column of three dots with a single bottom dot in a left column indicates that the character of a cell that follows is a number.

Major braille-producing countries have standards for the size and spacing of braille embossed on paper. In the United States and Canada, the de facto standard is set forth in Specification 800, "Braille Books and Pamphlets," from the National Library Service for the Blind and Physically Handicapped of the Library of Congress. Section 3.2 of Specification 800 (Braille Books and Pamphlets) February 2008 reads as follows:

Size and Spacing 3.2.1 The nominal height of braille dots shall be 0.019 inches [0.48 mm] and shall be uniform within any given transcription.

3.2.2 The nominal base diameter of braille dots shall be 0.057 inches [1.44 mm].

3.2.3 Cell spacing of dots shall conform to the following:

3.2.3.1 The nominal distance from center to center of adjacent dots (horizontally or vertically, but not diagonally) in the same cell shall be 0.092 inches [2.340 mm].

3.2.3.2 The nominal distance from center to center of corresponding dots in adjacent cells shall be 0.245 inches [6.2 mm].

3.2.4 The nominal line spacing of braille cells from center to center of nearest corresponding dots in adjacent lines shall be 0.400 inches [1.000 cm].

As an example, a tactile panel may include structures that can output (e.g., render) braille according to one or more standards. For example, the tactile braille panel 150 of FIG. 1 may include structural features to render braille dots in braille cells according to Specification 800 of the Library of Congress (2008). For example, the tactile braille panel 150 may include fluidic circuitry to increase pressure to a level sufficient to raise a dot by about 0.5 mm above a background height. As an example, a tactile panel may include structural features that can implement a six dot standard and/or an eight dot standard. For example, a device may include circuitry and a tactile panel that operate in a six dot mode or an eight dot mode.

In the example of FIG. 2, the device 220 includes a display 240 and a tactile panel 250 that overlays at least a portion of the display 240. As shown in FIG. 2, the display 240 can render a visual representation of a map of the United States where North Carolina is rendered visually as text 242 and a translation of that text is rendered tactilely in braille 252 (e.g., in an overlain manner, also illustrated in a side view) and where North Carolina may be rendered with visual highlighting 244 and tactile highlighting 254 (e.g., also illustrated in a side view). As an example, tactile highlighting may be composed of braille dots. As an example, tactile highlighting may be composed of a shape where, for example, the shape may have an elevation that corresponds approximately to a braille dot elevation.

In the example of FIG. 2, the method 280 includes a render block 282 for rendering information visually to a display, a reception block 284 for receiving touch input (e.g., a touch input signal, etc.) and a render block 286 for rendering information tactilely via a panel that overlays at least a portion of the display. For example, with respect to the device 220, such a method may include rendering a map visually to the display 240, receiving touch input where the touch input is associated with a location on the map (e.g., North Carolina) and rendering information tactilely via the tactile panel 250 at least in part in response to the receipt of the touch input. In such an example, the device 220 may render the braille 252 (e.g., to tactilely read North Carolina) and optionally the tactile indicator 254 (e.g., to tactilely locate or reference North Carolina on the map). In such an example, an audio option may be available to audibly render the words North Carolina (e.g., via a speaker).

Figure 3:
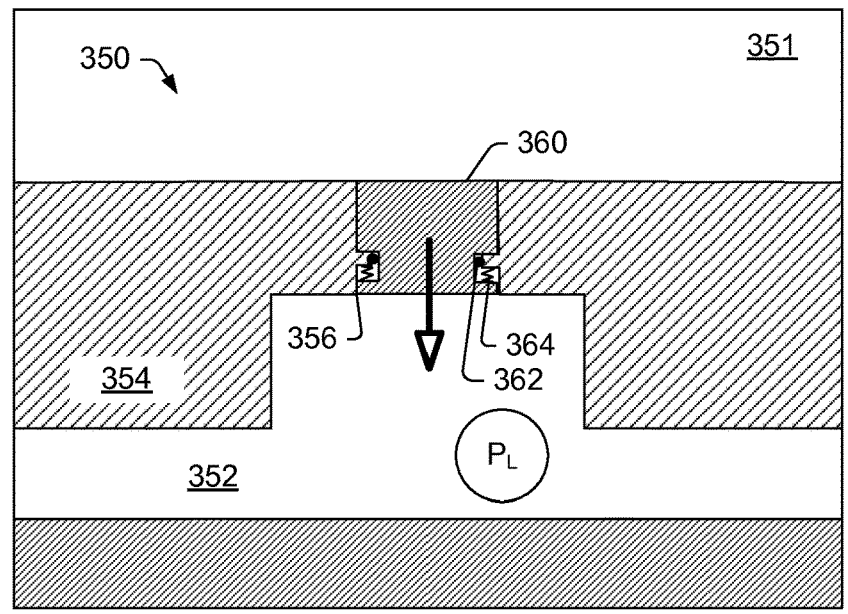
FIG. 3 is a diagram of an example of a portion of a tactile panel.
Figure 3:
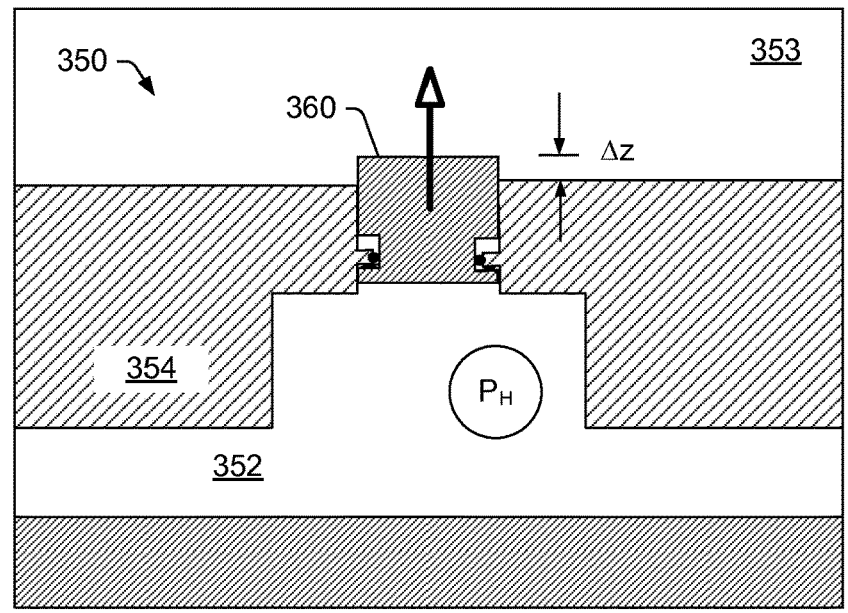

FIG. 3 shows another example of a tactile panel 350, which may be referred to as a tactile braille panel. FIG. 3 shows the tactile panel 350 in two states 351 and 353 with respect to a braille "dot" shape. As shown, the tactile panel 350 includes a component 354 that includes an opening 356 that at least partially receives a dot body 360 that may translate axially with respect to the opening 356 (e.g., in a z-direction). For example, an increase in volume due to an increase in fluid pressure for a fluid in a chamber 352 may cause the dot body 360 to translate axially upward such that it forms a braille dot (e.g., raises a portion of the dot body 360 axially above the component 354 by an axial distance that corresponds approximately to a dot height). In the example of FIG. 3, the state 351 may be referred to as a disengaged dot state, with respect to the tactile panel 350, and the state 353 may be referred to as an engaged dot state, with respect to the tactile panel 350.

As an example, the tactile panel 350 may include a seal element 362 that may form a fluid seal between the dot body 360 and another component such as the component 354. As an example, the tactile panel 350 may include an elastic element 364 that may bias the dot body 360 in a particular state. For example, the elastic element 364 may bias the dot body 360 with respect to the component 354 to maintain the dot body 360 in a disengaged state. In such an example, the force applied by the elastic element 364 (e.g., a spring force) may be sufficient to overcome the force of gravity as would be applied to the dot body 360 if it were part of a display of a device with the outwardly facing surface of the display facing downward (i.e., toward the Earth). In such an example, the elastic element 364 may avoid movement of the dot body 360 axially outwardly due to gravity. Further, the elastic element 364 may be selected with one or more characteristics (e.g., damping, spring constant, etc.) that enhance control. For example, the elastic element 364 may provide for smoother engagement and disengagement, the elastic element 364 may help to "filter out" pressure variations (e.g., pressure ripples, etc.), one or more characteristics of the elastic element 364 may vary with respect to fluidic circuitry in a manner that may account for pressure limits, variations in pressure limits, etc. that may be associated with different portions of the fluidic circuitry.

As to installation of a dot body, as an example, consider a component that includes an opening formed by an upper portion and a lower portion and one or more inward extensions that can act to limit axial translation of a dot body. In such an example, the dot body may be formed of two pieces where an upper piece is inserted into the upper portion of the opening and a lower piece is inserted into the lower portion of the opening such that the upper and lower pieces may be joined with an axial gap about a perimeter of the dot body that can receive the one or more inward extensions of the component. As another example, consider a dot body and a component that may be oriented with respect to each other for insertion and followed by a rotation, which may act to position and secure a dot body with respect to the component. For example, consider a dot body with openings that can be oriented with respect to one or more inward extensions in an opening of a component and where the dot body may be inserted into the opening and then rotated about its central axis to secure it with respect to the component (e.g., a bayonet type of mechanism).

As an example, a tactile panel may include circuitry that allows for actuation via flow of current. For example, a tactile panel may include one or more components that are made of a transparent conductive material. As an example, consider indium tin oxide as a transparent conducting oxide, which may be deposited, for example, as a thin film. Referring to the example of FIG. 3, as an example, a component such as the component 354 may be transparent and include one or more transparent conductors. In such an example, the conductors may be structured to generate a magnetic field in response to current therein.

As an example, where a dot body includes a magnetic material, it may respond to a generated magnetic field, for example, to move axially from one state to another state and vice versa. As an example, a dot body may be transparent and include a transparent magnetic material (e.g., consider nanocrystalline face-centered cubic (FCC) Ni, encapsulated $Fe_3O_4$ nanoparticles in a sol-gel silica network, etc.).

As an example, a dot body may include one or more transparent conductors, which may be optionally coupled with one or more other conductors. For example, the component 354 may include a conductor that couples to a conductor of the dot body 360 where current in one of the conductors generates a magnetic field in one direction and where current in the other conductor generates a magnetic field in an opposing direction. In such an example, current may cause the dot body 360 to translate axially in a particular direction. As an example, one or more switches may provide for reversing current direction in one or more conductors, for example, for generation of magnetic fields that may align or misalign (e.g., opposite polarity). In such an example, current transformed to magnetic fields may allow magnetic forces to control a state or states of a dot body with respect to another component. As an example, a tactile panel may include circuitry where a dot body may be positionable via current (e.g., on/off, frequency, direction, etc.).

As an example, a dot body may be sensitive to touch input. For example, a dot body may respond to pressure applied to a dot body surface. In such an example, applied pressure may cause the dot body to change position (e.g., elevation), which may optionally generate a signal. Such a signal may indicate, for example, a binary state (e.g., touch state/no touch state) and/or an amount of a parameter value (e.g., as related to elevation) for purposes of controlling one or more actions.

As an example, where a current-based approach to state transitions of a dot body is implemented, a tactile panel may include a limiting mechanism that limits axial translation of the dot body. In such an example, one or more elastic elements may be operatively coupled to the dot body, for example, to control mechanics with respect to states and state transitions. As an example, where a fluid circuit (e.g., gas and/or liquid) is not implemented for transitioning states of a dot body, a tactile panel may be designed with a clearance that may allow for transitioning while being relatively immune to intrusion of debris (e.g., finger soils, etc.), for example, optionally without a seal element being disposed about a dot body.

In the example of FIG. 1, the example of FIG. 2, and the example of FIG. 3, the tactile panels 150, 250 and 350 may be transparent and overlain on a display such as a visual display that can render information visually.

Figure 4:
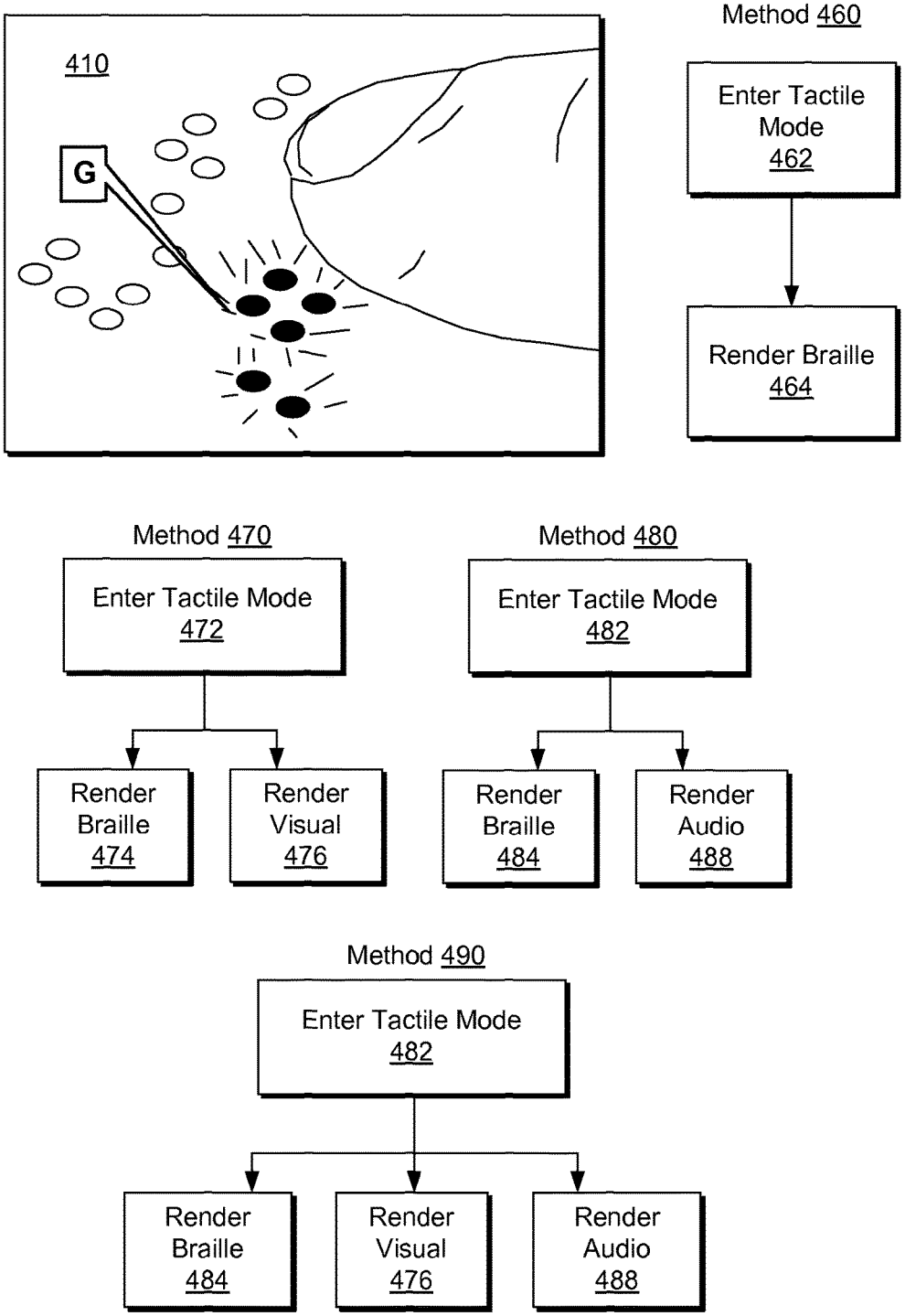
FIG. 4 is a diagram of an example of a device and examples of methods.

FIG. 4 shows an example of a device 410 and examples of method 460, 470, 480 and 490. As shown, the method 460 includes a tactile mode block 462 for entering a tactile mode of operation of a device and a render block 464 for rendering braille via a tactile panel. As shown, the method 470 includes a tactile mode block 472 for entering a tactile mode of operation of a device, a render block 474 for rendering braille via a tactile panel and a render block 476 for rendering visual information via a display. As shown, the method 480 includes a tactile mode block 482 for entering a tactile mode of operation of a device, a render block 484 for rendering braille via a tactile panel and a render block 488 for rendering audio information via audio circuitry. As shown, the method 490 includes a tactile mode block 492 for entering a tactile mode of operation of a device, a render block 494 for rendering braille via a tactile panel, a render block 476 for rendering visual information via a display and a render block 498 for rendering audio information via audio circuitry.

As an example, a method may render visual information to assist an individual that may have limited vision. In such an example, a display may render a high lumen graphic that may help guide an individual to a particular portion of the display that includes a tactile panel overlain for rendering braille. As an example, a display may be a touch-sensitive display such that upon receipt of a touch signal associated with a rendered braille character audio circuitry may render an audio signal (e.g., to a speaker, an audio interface, headphones, earphones, etc.).

As an example, a device may include features that may assist with learning of braille. For example, where a touch-sensitive display can receive touch associated with touching of a rendered braille character or characters, such touch may be received by circuitry that can cause audio rendering of a corresponding sound or sounds. For example, where an individual touches a rendered braille character for "G", the device may generate a signal responsive to the touch and cause audio circuitry to render the sound "G". Such an approach can provide feedback to enhance learning of braille. Such an approach may also provide for taking a break from braille interpretation. For example, a reader may cause a device to operate in an audio mode where audio is generated at a rate corresponding to a touch rate for touching rendered braille characters. In such an example, an individual does not necessarily need to interpret the characters to understand their meaning, rather, the individual may merely listen to the generated audio where the rate of the audio generated may be controlled by the individual's touch.

Figure 5:
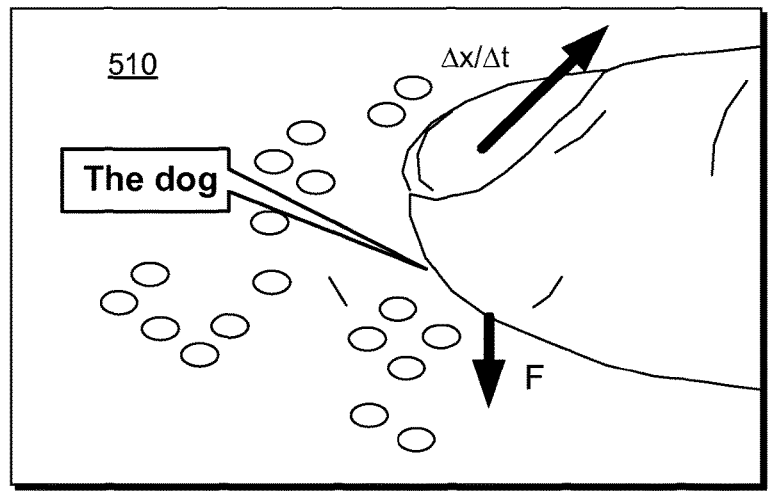
FIG. 5 is a diagram of an example of a device and an example of a method.
Figure 5:
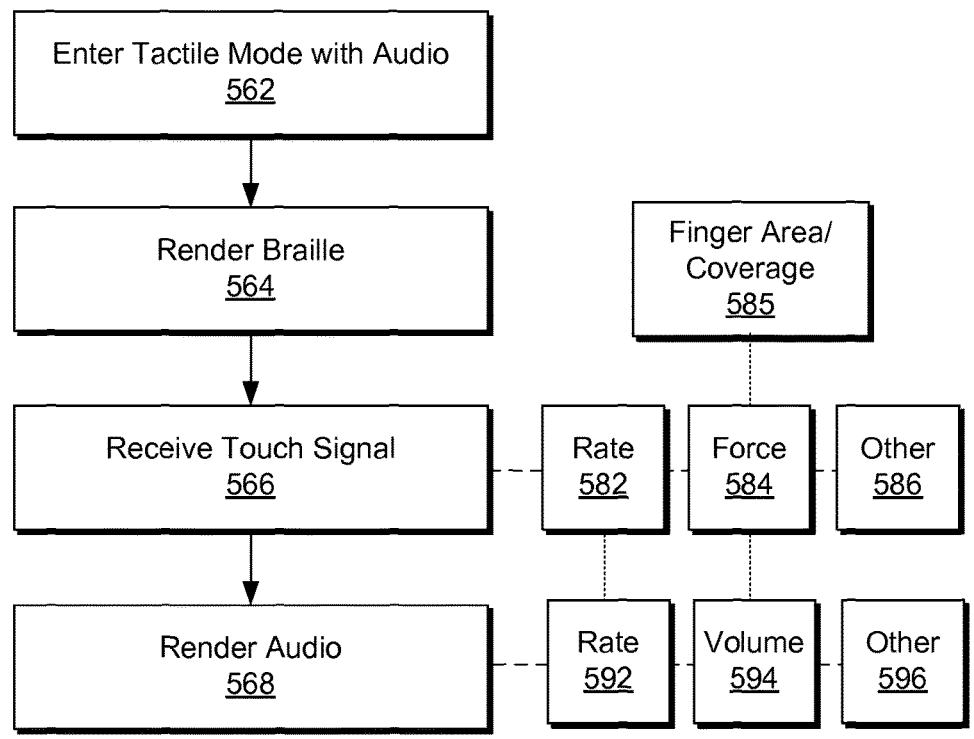

FIG. 5 shows an example of a device 510 and an example of a method 550. As shown, the method 550 can include a tactile mode with audio block 562 for enabling a tactile mode with audio where audio may be rendered along with braille. In such a mode, the method 550 can include a render block 564 for rendering braille, a reception block 566 for receipt of a touch signal or signals and a render block 568 for rendering audio (e.g., generation of audio signals, which may be directed to a speaker, etc.).

In the example of FIG. 5, the device 510 can include a touch-sensitive display and a tactile panel. As an example, the touch-sensitive display and/or the tactile panel may be configured to sense touch. In such an example, reception of touch signals may allow for determination of one or more of a touch rate, force of touch, etc., for example, as illustrated by a rate block 582, a force block 584 (e.g., pressure, translation, etc.) and an other block 586. As shown, force may be determined at least in part by a finger area or finger coverage determination. For example, as more force is applied, a finger may cover a greater area of the tactile panel and/or the display (e.g., due to deformation of the finger at the contact region). As an example, finger touch force may be sensed, for example, in fluidic circuitry of a tactile panel (e.g., as touch may force a dot axially downward and cause movement of fluid). As an example, finger touch force (e.g., pressure, translation, etc.) may be sensed, for example, via one or more techniques (e.g., via magnetic, electrical and/or fluidic circuitry of a tactile panel, magnetic and/or electrical circuitry of a touch-sensitive display, magnetic and/or electrical circuitry of a digitizer panel, etc.).

As to rendering of audio, a render rate may be determined based at least in part on a finger touch rate, as indicated by a rate block 592. For example, where a finger is translated across a tactile panel at a rate in distance per unit time (e.g., $\Delta x/\Delta t$), such information may be converted to a speed play signal for audio where the audio corresponds to a braille-to-audio transformation. For example, where "The dog" is rendered in braille, touching of the braille at a touch rate may cause audio of "the dog" to be rendered at a corresponding rate (e.g., the faster the touch rate, the faster the audio rate).

As an example, force of touch (e.g., F) or pressure may be used to determine, directly and/or indirectly, one or more parameters of audio rendering, for example, as indicated by a volume block 594. For example, force may determine a volume for audio rendering where the greater the force the higher the volume. In such an example, where an individual touches the braille with audio enabled, if the volume is not sufficiently high, the individual may touch the braille with slightly greater force where the change in force may be sensed and converted to a signal (e.g., command, etc.) that causes the device 510 to increase the volume of audio rendering (e.g., a speaker volume, etc.). As an example, consider an individual using the device 510 in an environment where noise level may change from time-to-time. Even where the individual may be using earphones (e.g., or a single earphone), the noise level may become distracting. To increase audio signal with respect to ambient noise, the individual may apply more force to touching rendered braille characters. As such ambient noise level may vary, the individual may readily vary applied force, for example, without having to touch a volume control button, whether physical or graphic.

Figure 6:
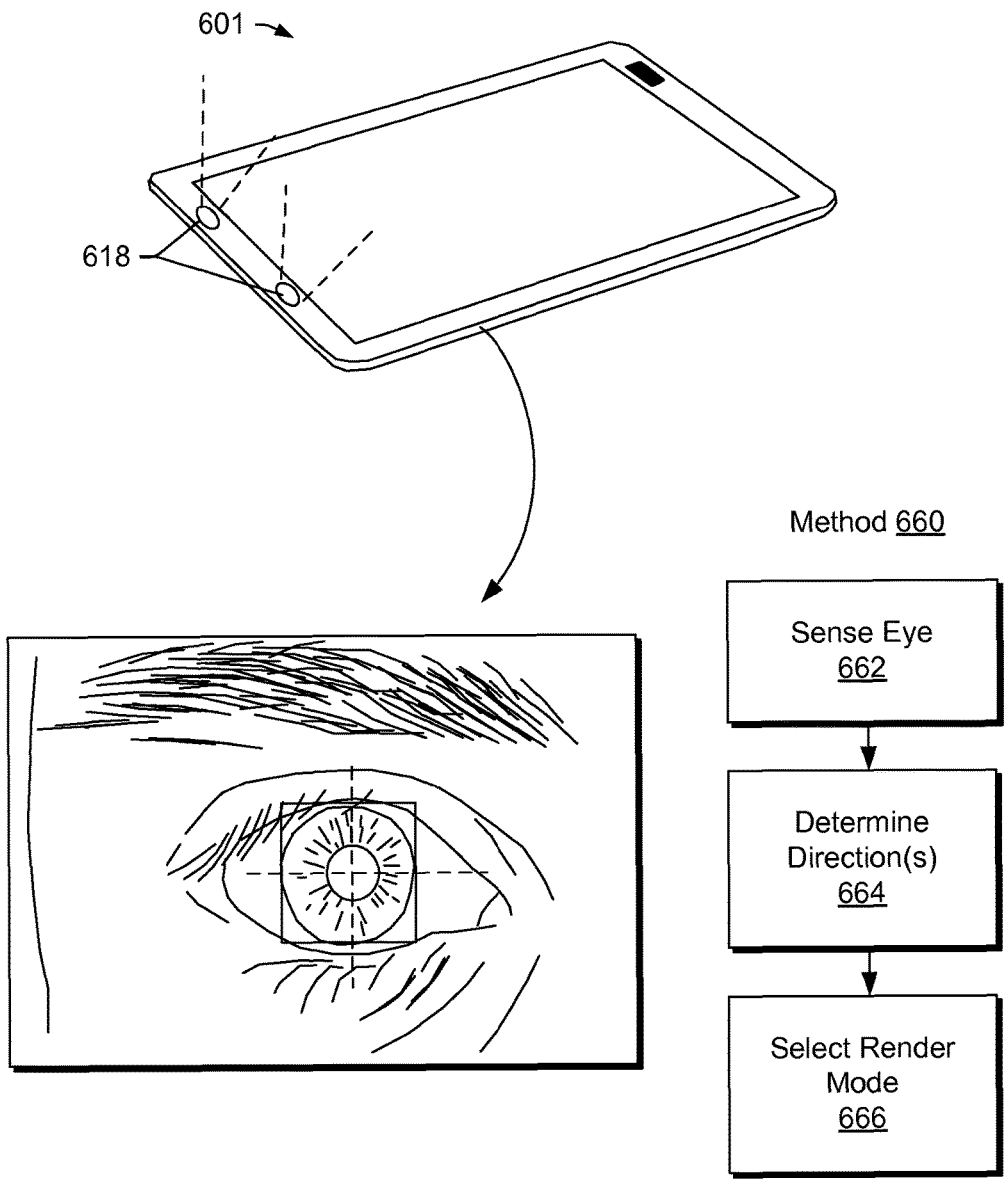
FIG. 6 is a diagram of an example of a device and an example of a method.

FIG. 6 shows an example of a device 601 that includes one or more sensors 618 for sensing information related to the eye or eyes and an example of a method 660. For example, the one or more sensors 618 may include an eye tracking sensor (see, e.g., approximate illustration of an eye locating mechanism). As shown in FIG. 6, the method 660 can include a sense block 662 for sensing an eye, a determination block 664 for determining a direction or directions based at least in part on sensing the eye or eyes, and a selection block 666 for selecting a render mode for the device 601 based at least in part on one or more eye-related determinations.

As an example, the device 601 may include circuitry that can implement an algorithm that may include capturing an image and analyzing the image for indicia of an eye (e.g., an iris, a pupil, etc.). In such an example, the analysis may indicate a gaze direction for the eye. As an example, such a method may include eye tracking, for example, by acquiring multiple images (e.g., successively) and analyzing each of the images to determine whether a pupil (e.g., eye gaze) has changed with respect to time.

When a person with normal vision fixes her eyes upon a stationary target, her gaze is not perfectly still, due to small movements that prevent visual fading; however, a person with visual loss may exhibit greater instability of gaze. As an example, a method can include sensing monocular and/or binocular gaze. Such sensing may indicate a level of gaze instability associated with visual impairment, which may be due to loss of inputs that normally optimize the performance of the neural network (integrator), which ensures both monocular and conjugate gaze stability. Further, as an example, binocular sensing of a person with early-onset monocular loss of vision may show greater instability of vertical gaze in the eye with visual loss and, to a lesser extent, in the normal eye, compared to a people with normal vision.

As an example, eye speed may be a parameter that may be determined at least in part via one or more sensors of a device. As to eye speed, people with monocular visual loss may exhibit eye speed greater in eye with poorer vision and, for example, the fastest eye-drift speeds may be for people that have been blind since birth. In terms of degrees per second, as an example, consider of normal being about 1 degree per second or less while a person blind since birth being greater than about 10 degrees per second. People that are blind may exhibit an inability to maintain steady eye position, for example, with a consequent jerk nystagmus. Where a device may sense an inability to maintain a steady eye position (e.g., according to one or more metrics), the device may select a render mode such as a braille render mode, an audio render mode or a braille and audio render mode.

Figure 7:
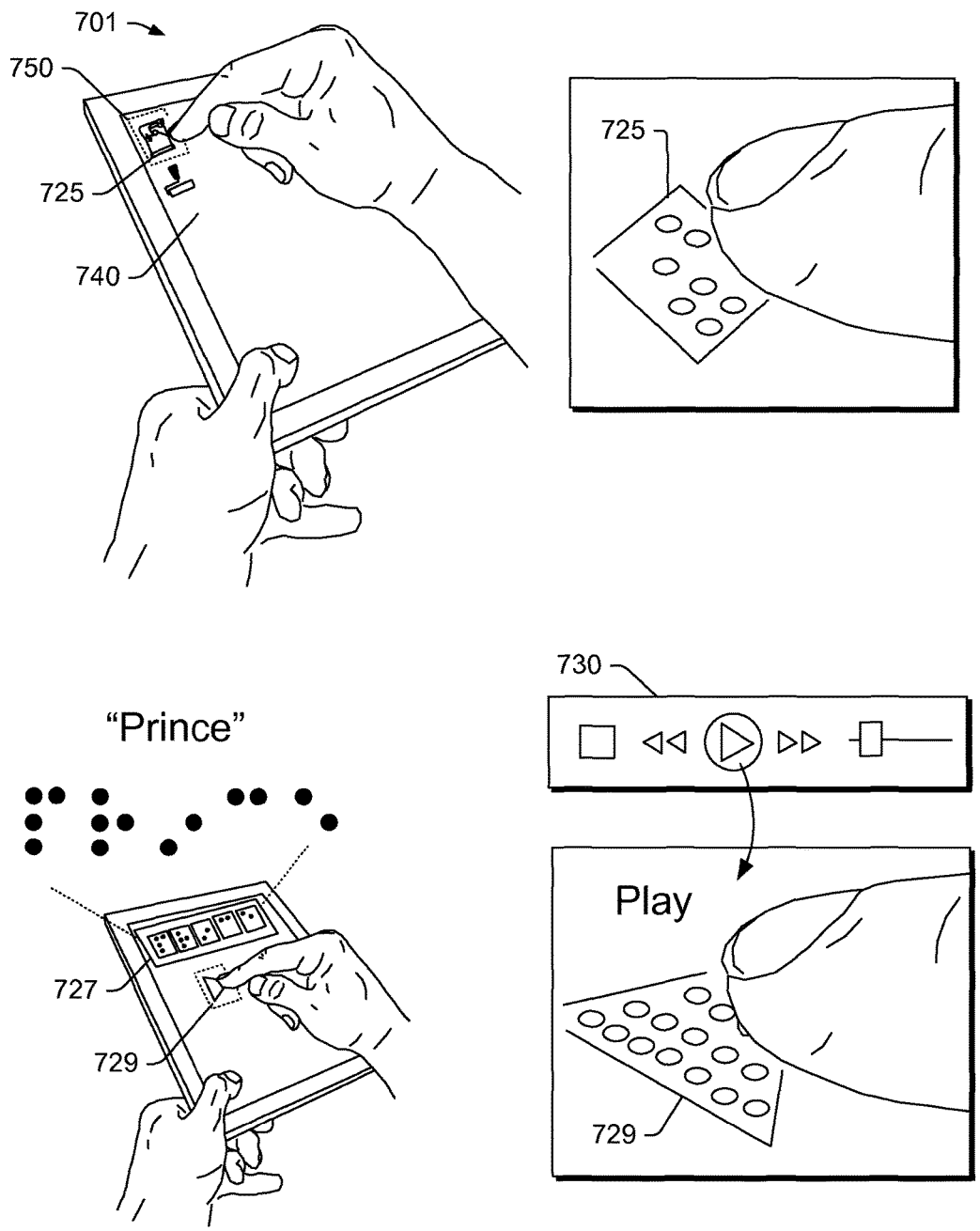
FIG. 7 is a diagram of an example of a device and examples of tactilely rendered information and controls.

FIG. 7 shows an example of a device 701 that includes a display 740 and a tactile panel 750. In such an example, the display 740 and/or the tactile panel 750 may be touch-sensitive. As shown, an icon 725 may be rendered via a tactile panel 750, which may overlay at least a portion of the display 740. As an example, a visual icon may be rendered at a corresponding position on the display 740 where the icon 725 is rendered tactilely over the visual icon. As an example, the icon 725 may be for launching an application such as, for example, a media player that is configured to render audio from one or more audio files (e.g., .wav, .mp3, etc.), which may be considered to be one or more media files.

In the example of FIG. 7, touching of the icon 725 instructs the device 701 to launch a media player application, which may include a field 727 where braille may be rendered to indicate metadata, etc. associated with a media file. For example, in FIG. 7, dots indicate the name of the artist "Prince". As shown, the media player application may include instructions executable to call for rendering of one or more media controls in tactile form. For example, consider a play control 729, which may be formed via dots or other tactile structures. As shown, a user may feel for one or more of controls and then locate the control 729 as a tactilely rendered control and select it, which may then instruct operation (e.g., control) the media player application (e.g., to play a media file with audio content from the artist Prince).

Also shown in FIG. 7 is an example of a control field 730 where the play control 729 may be a portion of the control field 730. As shown, the control field 730 includes a stop control, a fast-forward control, a reverse control and a volume control. As an example, the volume control may be tactilely rendered such that dots follow the movement of touch of a user. For example, if a touch-sensor senses a user's finger moving to the right, a device may render dots to the right to maintain a "control" underneath the user's finger. If a user then returns to the control field 730, the volume slider may be at a last set position.

As an example, a tactile panel may render one or more dots, features, etc. that may optionally pulse to music. For example, a user may feel a musical pulse via dots while music is being player. In such an example, the dots may translate axially, for example, between an engaged state elevation and a disengaged state elevation. Such a device may be useful for a person that is both hearing and vision impaired.

Figure 8:
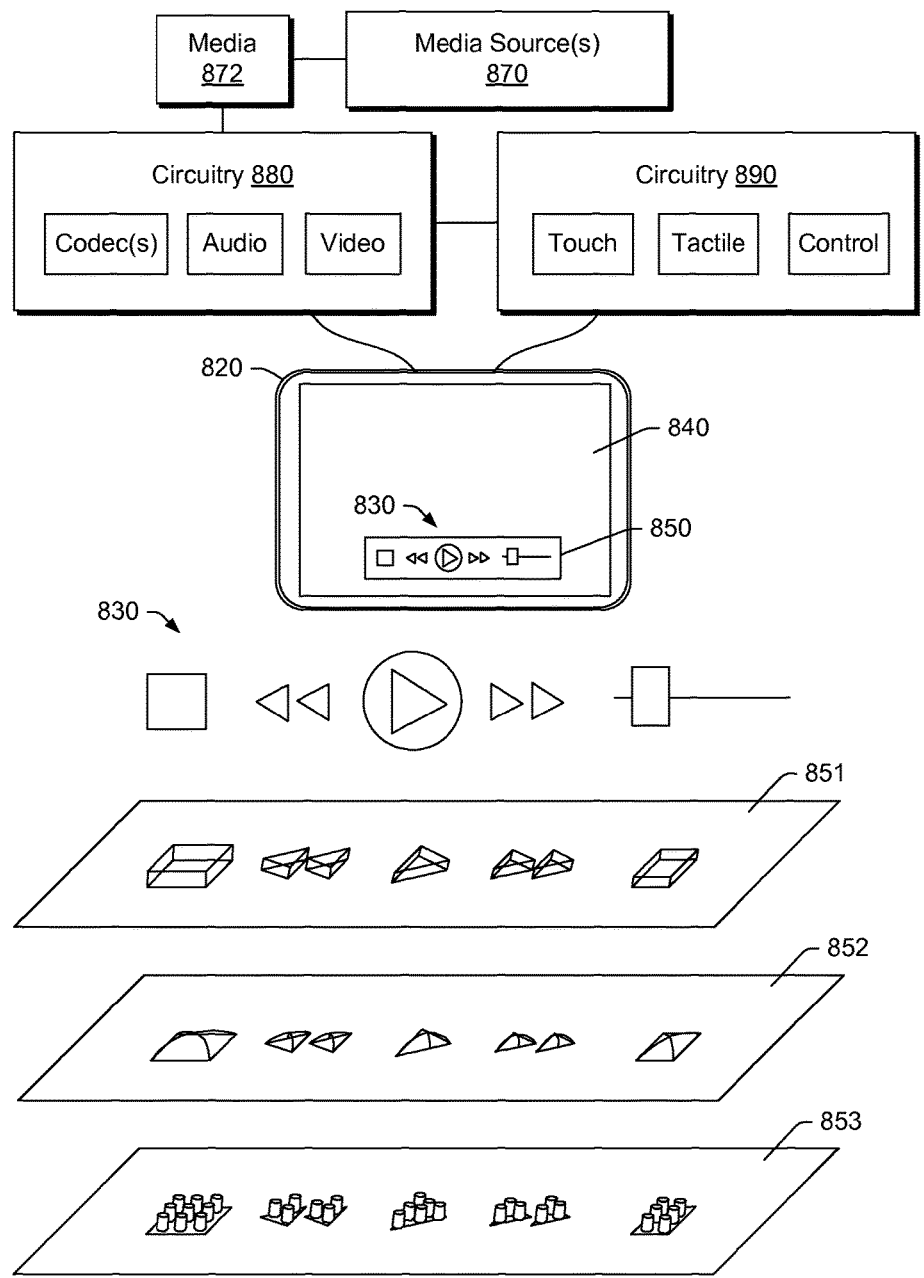
FIG. 8 is a diagram of an example of a device and examples of tactilely rendered controls.

FIG. 8 shows an example of a device 820 that includes a tactile panel 850 that may tactilely render information, for example, as illustrated in one or more examples 851, 852 and 853.

As shown in FIG. 8, the device 820 includes a display 840 and the tactile panel 850 as well as circuitry 880 and circuitry 890. The circuitry 880 may include one or more of audio circuitry, video circuitry, codec circuitry, etc. The circuitry 890 may include one or more of touch circuitry, tactile circuitry and control circuitry. As illustrated, the device 820 may access, receive, etc. media 872 via one or more media sources 870. For example, consider a media library as a media source stored in memory of the device 820. As another example, consider a remotely stored media library that may be accessible by the device 820 via one or more networks.

As an example, the device 820 may render the media 872 using the circuitry 880. In such an example, the device 820 may include instructions stored in memory and executable by a processor to launch a media player application, which may interact with the circuitry 880 (e.g., directly, via one or more application programming interfaces, etc.). Where the device 820 is configured to operate in at least a tactile mode, one or more functions associated with the media player application may be controlled via touch input (e.g., controllable via touch input). For example, the device 820 may render at least tactilely one or more controls that can be actuated via touch input to thereby control one or more functions associated with the media player application.

As an example, the device 820 may execute a media player application and render tactilely controls via the tactile panel 850. Such controls may include, for example, a stop control, a rewind control, a play/pause control, a fast-forward control and optionally a volume control. As shown in FIG. 8, the tactile panel 850 may be constructed to render controls as raised blocks per the example 851 (e.g., as rectangles, triangles, etc.), the tactile panel 850 may be constructed to render controls as bubbles that rise from edges to a peak per the example 852 and/or the tactile panel 850 may be constructed to render controls as dots (e.g., within respective shape borders) per the example 853. As an example, a tactile panel may be constructed with a membrane that responds locally to fluid pressure supplied via an opening where upon increase in the fluid pressure and fluid pressure of one or more neighboring openings the membrane transitions from individual bumps to a collective "bump". For example, consider the example 852 where a desired shape may be formed via supply of pressure to a plurality of openings where ramping up of pressure causes individual bumps to coalesce into the desired shape. As an example, a membrane may be more elastic at individual openings for formation of individual bumps at a particular opening pressure and include inter-bump region elasticity that allows for shape formation at opening pressures that are greater than the individual bump formation opening pressure.

As mentioned, a control may be tactilely rendered with respect to position associated with the control where, for example, the tactile rendering may move with respect to touch input. For example, a user may touch a control with a finger and then move the finger where the control follows the user's finger. While such a mechanism is described with respect to a control of a media player, such a mechanism may optionally be implemented, for example, as a drag-and-drop mechanism. For example, an icon may be rendered tactilely where the icon may be dragged and dropped via touch input. As another example, consider text editing where a portion of text rendered in braille may be dragged and dropped from one region of a tactile panel to another region. In such an example, a display may render information visually that follows a drag-and-drop action. As an example, touch input may cause fluidic circuitry or other tactile rendering circuitry to move one or more tactile representations of information from one location to another location or, for example, from one orientation to another orientation (e.g., consider a rotation of a tactile representation).

As an example, a device can include media player circuitry; a display that renders visual media player controls; a tactile panel that renders tactile media player controls; and control circuitry that controls the media player circuitry via touch input signals associated with at least the tactile media player controls. For example, the device 820 can include the circuitry 880 as media player circuitry, the display 840, the tactile panel 850 and the circuitry 890 as, at least in part, control circuitry where the tactile panel 850 can render tactile media player controls (see, e.g., the controls 830) that can be actuated via touch input to generate touch input signals. In such an example, the display 840 and/or the tactile panel 850 may include touch-sensitive circuitry (e.g., to generate touch input signals responsive to touch). As an example, the display 840 may render visual media player controls, which may optionally underlie one or more tactile media player controls.

As an example, media metadata may be descriptive metadata associated with media. For example, consider a song title, an artist, a length of a song, an album title, etc. As an example, a device may include a tactile panel that can render, tactilely in braille, media metadata of media associated with media player circuitry.

Figure 9:
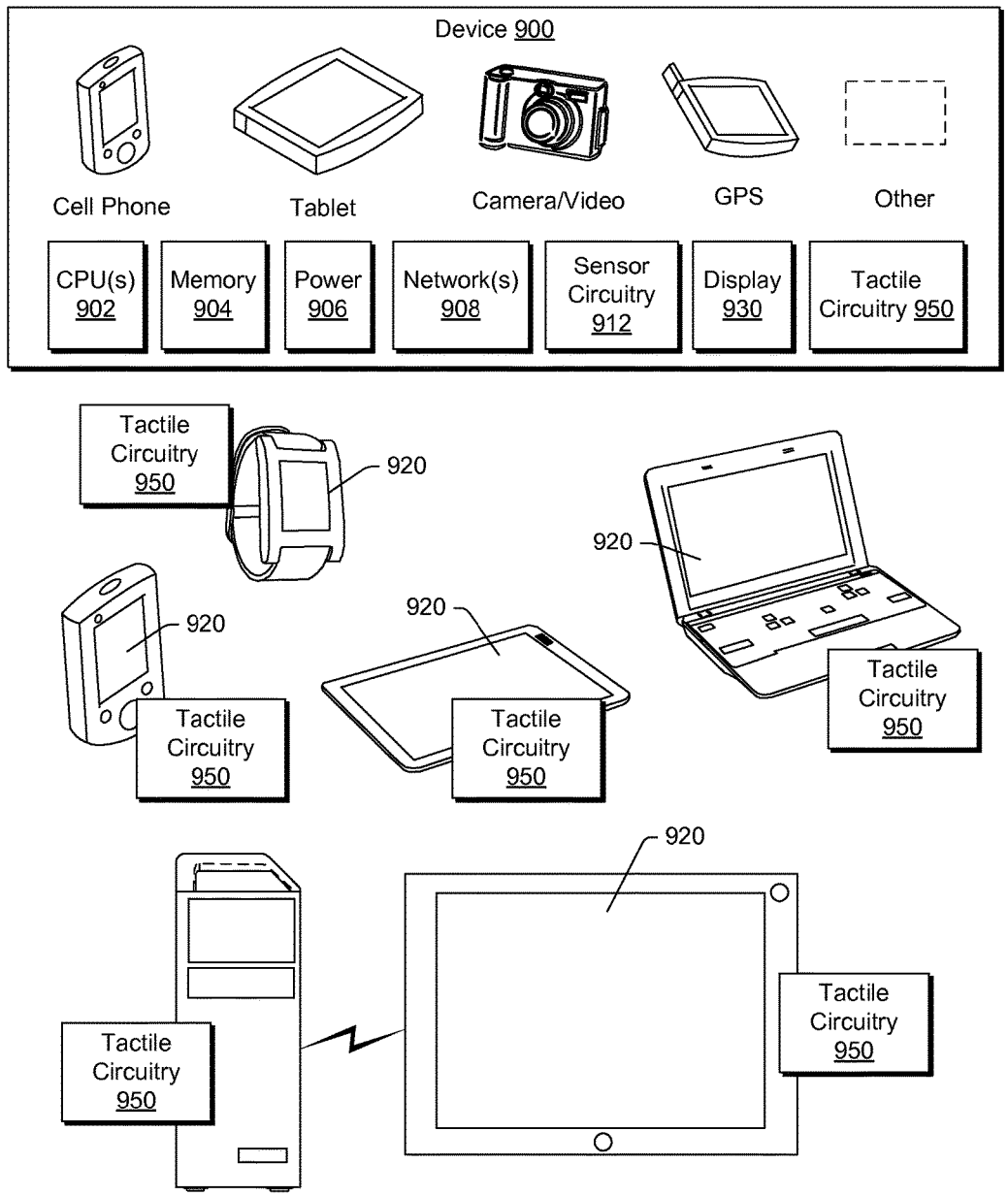
FIG. 9 is a diagram of examples of devices that can include tactile circuitry.

FIG. 9 shows an example of a device 900 that includes a display 930 and tactile circuitry 950. As shown, the device 900 may be configured as a watch (e.g., a wearable device), a phone, a tablet, a notebook, a desktop system, a camera, a GPS device or other device. As an example, the device 900 may include one or more processors 902, memory 904, a power source 906, one or more network interfaces 908, sensor circuitry 912, a display 930 (e.g., or displays), and tactile circuitry 950 (e.g., including a tactile panel).

As an example, tactile circuitry may include a fluidic network (e.g., fluidic circuitry). As an example, a device may include circuitry to that controls fluid pressure in a fluidic network, for example, for formation of dots and/or one or more other features.

As an example, a device may include sensing circuitry to sense eye movement (e.g., eye-tracking or gaze), for example, to select a mode of operation, etc. In such an example, circuitry to select may include an eye movement parameter where a selection by the circuitry depends at least in part on the eye movement parameter.

As an example, an apparatus (e.g., a device) can include a processor; memory operatively coupled to the processor; a touch-sensitive display operatively coupled to the processor; and a tactile braille panel operatively coupled to the processor wherein the tactile braille panel overlays at least a portion of the touch-sensitive display. In such an example, circuitry can be included that renders characters to the touch-sensitive display and that renders corresponding braille characters to the tactile braille panel. For example, one of the braille characters rendered to the tactile braille panel may overlay a corresponding one of the characters rendered to the touch-sensitive display.

As an example, an apparatus may include circuitry that selectively operates the apparatus in one of a touch-sensitive display render mode, a tactile braille panel render mode and a touch-sensitive display and tactile braille panel render mode.

As an example, an apparatus may include a sensor operatively coupled to eye-tracking circuitry that outputs eye position information. In such an example, the apparatus may include circuitry that selectively operates the apparatus in one of a touch-sensitive display render mode, a tactile braille panel render mode and a touch-sensitive display and tactile braille panel render mode based at least in part on eye position information output by the eye-tracking circuitry.

As an example, an apparatus may include touch sensing circuitry operatively coupled to a tactile braille panel and activated in a tactile braille panel render mode. In such an example, the apparatus may include audio circuitry that generates audio signals responsive to sensed touch of one or more rendered braille characters by the touch sensing circuitry. For example, audio circuitry may generate audio signals based at least in part on a determined touch rate associated with sensed touch of the one or more rendered braille characters.

As an example, an apparatus may include braille rendering circuitry that renders braille characters to a tactile braille panel based at least in part on sensed touch of one or more rendered braille characters by a touch sensing circuitry. In such an example, the braille rendering circuitry may render braille characters based at least in part on a determined touch rate associated with sensed touch of the one or more rendered braille characters by the touch sensing circuitry.

As an example, a method may include rendering information to a touch-sensitive display; and rendering braille characters to a tactile panel that overlays at least a portion of the touch-sensitive display. In such an example, the method may include receiving touch input via the touch-sensitive display and, responsive to the touch input, refreshing the tactile panel. As an example, rendering braille characters may render braille dots that include an elevation of at least approximately 0.5 mm. As an example, a method may include rendering a tactile control to a tactile panel and, for example, receiving an actuation signal associated with the tactile control and issuing a command that launches an application. As an example, an application may be a media player and a method may include rendering tactile controls to a tactile panel for controlling the media player.

As an example, one or more computer-readable storage media can include processor-executable instructions to instruct a computer to: render information to a touch-sensitive display; render braille characters to a tactile panel that overlays at least a portion of the touch-sensitive display; and render at least one tactile control to the tactile panel. In such an example, the one or more computer-readable storage media may include processor-executable instructions to instruct a computer to operate in one of a touch-sensitive display render mode, a tactile panel render mode and a touch-sensitive display and tactile panel render mode. As an example, one or more computer-readable storage media may include processor-executable instructions to instruct a computer to adjust a dot elevation parameter for rendering of braille character dots. As an example, one or more computer-readable storage media may include processor-executable instructions to instruct a computer to receive a force signal and optionally associate the force signal with a command. For example, consider a force of touch of tactilely rendered information being associated with volume for audio rendering of the information.

As an example, an apparatus can include media player circuitry; a display that renders visual media player controls; a tactile panel that renders tactile media player controls; and control circuitry that controls the media player circuitry via touch input signals associated with at least the tactile media player controls. In such an example, tactile panel can render, tactilely in braille, media metadata of media associated with the media player circuitry. As an example, an apparatus may include a tactile panel and a display where at least a portion of the tactile panel overlies at least a portion of the display.

As described herein, various acts, steps, etc., may be implemented as instructions stored in one or more computer-readable storage media. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 10:
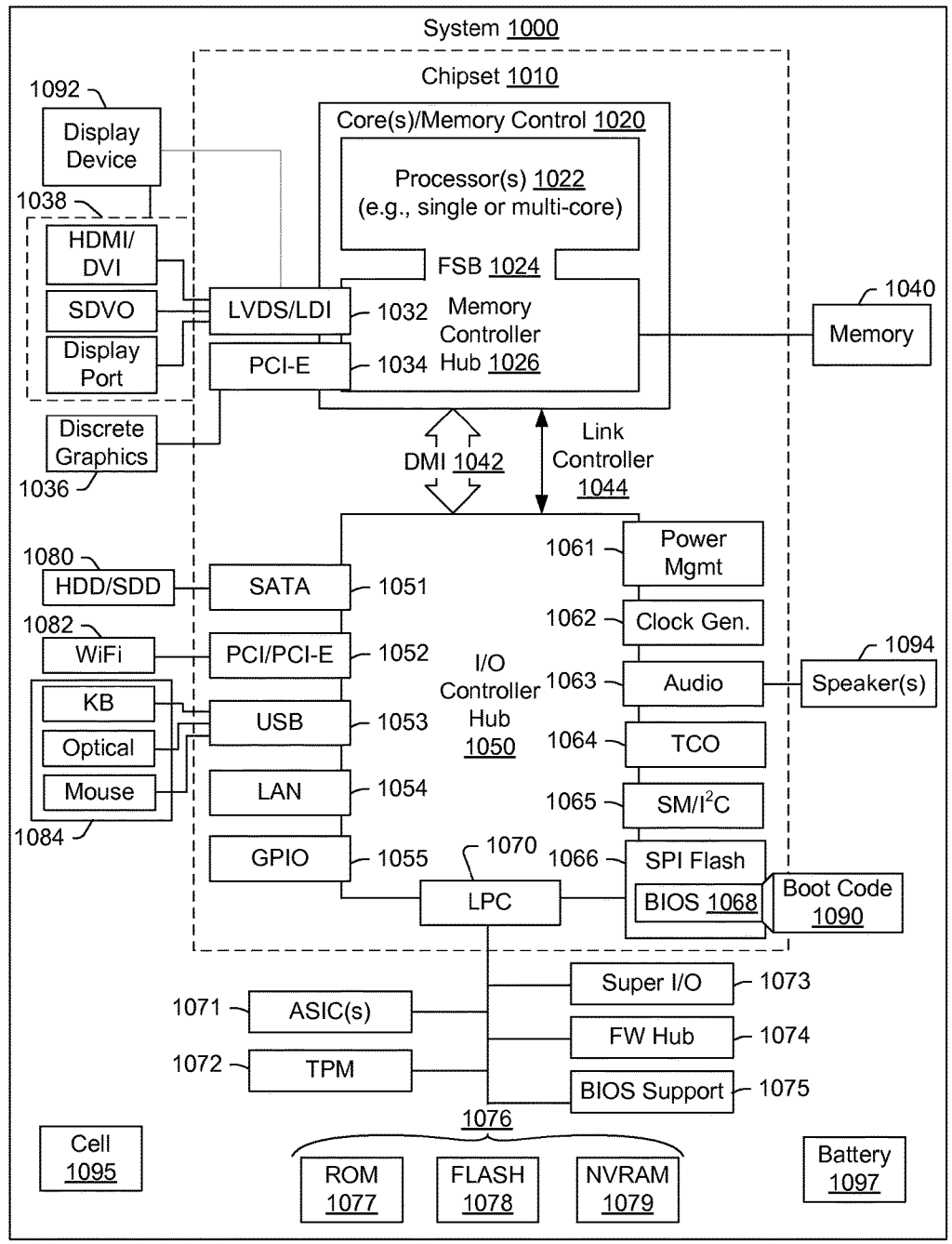
FIG. 10 is a diagram of an example of a system that includes one or more processors.

While various examples of circuits or circuitry have been discussed, FIG. 10 depicts a block diagram of an illustrative various components of a computer system 1000. As an example, a device such as one of the devices of FIG. 9 may include at least some of the features of the system 1000.

As shown in FIG. 10, the system 1000 includes a so-called chipset 1010. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 10, the chipset 1010 has a particular architecture, which may vary to some extent depending on brand or manufacturer. The architecture of the chipset 1010 includes a core and memory control group 1020 and an I/O controller hub 1050 that exchange information (e.g., data, signals, commands, etc.) via, for example, a direct management interface or direct media interface (DMI) 1042 or a link controller 1044. In the example of FIG. 10, the DMI 1042 is a chip-to-chip interface (sometimes referred to as being a link between a "northbridge" and a "southbridge").

The core and memory control group 1020 include one or more processors 1022 (e.g., single core or multi-core) and a memory controller hub 1026 that exchange information via a front side bus (FSB) 1024. As described herein, various components of the core and memory control group 1020 may be integrated onto a single processor die, for example, to make a chip that supplants the conventional "northbridge" style architecture.

The memory controller hub 1026 interfaces with memory 1040. For example, the memory controller hub 1026 may provide support for DDR SDRAM memory (e.g., DDR, DDR2, DDR3, etc.). In general, the memory 1040 is a type of random-access memory (RAM). It is often referred to as "system memory".

The memory controller hub 1026 further includes a low-voltage differential signaling interface (LVDS) 1032. The LVDS 1032 may be a so-called LVDS Display Interface (LDI) for support of a display device 1092 (e.g., a CRT, a flat panel, a projector, etc.). A block 1038 includes some examples of technologies that may be supported via the LVDS interface 1032 (e.g., serial digital video, HDMI/DVI, display port). The memory controller hub 1026 also includes one or more PCI-express interfaces (PCI-E) 1034, for example, for support of discrete graphics 1036. Discrete graphics using a PCI-E interface has become an alternative approach to an accelerated graphics port (AGP). For example, the memory controller hub 1026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1050 includes a variety of interfaces. The example of FIG. 10 includes a SATA interface 1051, one or more PCI-E interfaces 1052 (optionally one or more legacy PCI interfaces), one or more USB interfaces 1053, a LAN interface 1054 (more generally a network interface), a general purpose I/O interface (GPIO) 1055, a low-pin count (LPC) interface 1070, a power management interface 1061, a clock generator interface 1062, an audio interface 1063 (e.g., for speakers 1094), a total cost of operation (TCO) interface 1064, a system management bus interface (e.g., a multi-master serial computer bus interface) 1065, and a serial peripheral flash memory/controller interface (SPI Flash) 1066, which, in the example of FIG. 10, includes BIOS 1068 and boot code 1090. With respect to network connections, the I/O hub controller 1050 may include integrated gigabit Ethernet controller lines multiplexed with a PCI-E interface port. Other network features may operate independent of a PCI-E interface.

The interfaces of the I/O hub controller 1050 provide for communication with various devices, networks, etc. For example, the SATA interface 1051 provides for reading, writing or reading and writing information on one or more drives 1080 such as HDDs, SDDs or a combination thereof. The I/O hub controller 1050 may also include an advanced host controller interface (AHCI) to support one or more drives 1080. The PCI-E interface 1052 allows for wireless connections 1082 to devices, networks, etc. The USB interface 1053 provides for input devices 1084 such as keyboards (KB), one or more optical sensors, mice and various other devices (e.g., microphones, cameras, phones, storage, media players, etc.). On or more other types of sensors may optionally rely on the USB interface 1053 or another interface (e.g., I²C, etc.). As to microphones, the system 1000 of FIG. 10 may include hardware (e.g., audio card) appropriately configured for receipt of sound (e.g., user voice, ambient sound, etc.).

In the example of FIG. 10, the LPC interface 1070 provides for use of one or more ASICs 1071, a trusted platform module (TPM) 1072, a super I/O 1073, a firmware hub 1074, BIOS support 1075 as well as various types of memory 1076 such as ROM 1077, Flash 1078, and non-volatile RAM (NVRAM) 1079. With respect to the TPM 1072, this module may be in the form of a chip that can be used to authenticate software and hardware devices. For example, a TPM may be capable of performing platform authentication and may be used to verify that a system seeking access is the expected system.

The system 1000, upon power on, may be configured to execute boot code 1090 for the BIOS 1068, as stored within the SPI Flash 1066, and thereafter processes data under the control of one or more operating systems and application software (e.g., stored in system memory 1040). An operating system may be stored in any of a variety of locations and accessed, for example, according to instructions of the BIOS 1068. Again, as described herein, a satellite, a base, a server or other machine may include fewer or more features than shown in the system 1000 of FIG. 10. Further, the system 1000 of FIG. 10 is shown as optionally include cell phone circuitry 1095, which may include GSM, CDMA, etc., types of circuitry configured for coordinated operation with one or more of the other features of the system 1000. Also shown in FIG. 10 is battery circuitry 1097, which may provide one or more battery, power, etc., associated features (e.g., optionally to instruct one or more other components of the system 1000). As an example, a SMBus may be operable via a LPC (see, e.g., the LPC interface 1070), via an I²C interface (see, e.g., the SM/I²C interface 1065), etc.

Conclusion

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   a processor;
   memory operatively coupled to the processor;
   a touch-sensitive display operatively coupled to the processor;
   a tactile braille panel operatively coupled to the processor wherein the tactile braille panel overlays at least a portion of the touch-sensitive display; and
   braille rendering circuitry that, in a braille mode, renders braille characters to the tactile braille panel, that receives touch input for sensed touches of the rendered braille characters, that determines a touch rate based at least in part on the touch input, and that controls a rendering rate of braille characters to the tactile braille panel based at least in part on the determined touch rate.

2. The apparatus of claim 1 comprising circuitry that renders characters to the touch-sensitive display and that renders corresponding braille characters to the tactile braille panel.

3. The apparatus of claim 2 wherein one of the braille characters rendered to the tactile braille panel overlays a corresponding one of the characters rendered to the touch-sensitive display.

4. The apparatus of claim 1 further comprising circuitry that selectively operates the apparatus in one of a touch-sensitive display render mode, a tactile braille panel render mode and a touch-sensitive display and tactile braille panel render mode.

5. The apparatus of claim 1 further comprising a sensor operatively coupled to eye-tracking circuitry that outputs eye position information.

6. The apparatus of claim 5 further comprising circuitry that selectively operates the apparatus in one of a touch-sensitive display render mode, a tactile braille panel render mode and a touch-sensitive display and tactile braille panel render mode based at least in part on eye position information output by the eye-tracking circuitry.

7. The apparatus of claim 1 further comprising audio circuitry that generates audio signals responsive to sensed touch of one or more rendered braille characters.

8. The apparatus of claim 7 wherein the audio circuitry generates audio signals based at least in part on the determined touch rate associated with sensed touch of a plurality of rendered braille characters.

9. A method comprising:
rendering information to a touch-sensitive display;
in a braille mode, rendering braille characters to a tactile panel that overlays at least a portion of the touch-sensitive display;
determining a touch rate based on receiving touch input for sensed touches of at least some of the rendered braille characters; and
based at least in part on the touch rate, rendering additional braille characters to the tactile panel.

10. The method of claim 9 further comprising receiving touch input via the touch-sensitive display and, responsive to the touch input, refreshing the tactile panel.

11. The method of claim 9 wherein the rendering braille characters renders braille dots that comprise an elevation of at least approximately 0.5 mm.

12. The method of claim 9 further comprising rendering a tactile control to the tactile panel.

13. The method of claim 12 further comprising receiving an actuation signal associated with the tactile control and issuing a command that launches an application.

14. The method of claim 13 wherein the application comprises a media player and further comprising rendering tactile controls to the tactile panel for controlling the media player.

* * * * *